(12) United States Patent
Warzok et al.

(10) Patent No.: US 12,312,215 B2
(45) Date of Patent: May 27, 2025

(54) SYSTEM FOR LIFTING A WIND TURBINE ROTOR BLADE

(71) Applicants: Nordex Energy SE & Co. KG, Hamburg (DE); Nordex Energy Spain S.A.U., Barásoain (ES)

(72) Inventors: Felix Warzok, Meissen (DE); Mikel Salaberri, Cordovilla (ES)

(73) Assignees: Nordex Energy SE & Co. KG, Hamburg (DE); Nordex Energy Spain S.A.U., Barásoain (ES)

( * ) Notice: Subject to any disclaimer, the term of this patent is extended or adjusted under 35 U.S.C. 154(b) by 180 days.

(21) Appl. No.: 18/165,087

(22) Filed: Feb. 6, 2023

(65) Prior Publication Data

US 2023/0257234 A1    Aug. 17, 2023

(51) Int. Cl.
*B66C 1/10* (2006.01)
*B66C 1/12* (2006.01)
*B66C 1/18* (2006.01)
*F03D 13/10* (2016.01)

(52) U.S. Cl.
CPC ............. *B66C 1/108* (2013.01); *B66C 1/122* (2013.01); *B66C 1/18* (2013.01); *F03D 13/10* (2016.05); *F05B 2230/61* (2013.01)

(58) Field of Classification Search
CPC . B66C 1/108; B66C 1/122; B66C 1/18; F03C 13/10; F03C 13/104; F03C 13/139; F05B 2230/61
See application file for complete search history.

(56) References Cited

U.S. PATENT DOCUMENTS

| | | | |
|---|---|---|---|
| 4,039,217 A * | 8/1977 | Bryant | B66C 1/122 294/74 |
| 9,016,989 B2 | 4/2015 | Nagabhushana et al. | |
| 2012/0098283 A1 | 4/2012 | Maj et al. | |
| 2015/0028610 A1 | 1/2015 | Hansen et al. | |

FOREIGN PATENT DOCUMENTS

| | | |
|---|---|---|
| DE | 10 2011 113 482 A1 | 3/2013 |
| DE | 10 2018 000 372 A1 | 7/2019 |
| WO | 2013/091655 A1 | 6/2013 |

* cited by examiner

*Primary Examiner* — Moshe Wilensky
(74) *Attorney, Agent, or Firm* — Walter Ottesen, P.A.

(57) ABSTRACT

A system for lifting a wind turbine rotor blade, including a wind turbine rotor blade, a lifting device having a sling, the sling supporting the wind turbine rotor blade at a longitudinal position where the wind turbine rotor blade has an aerodynamic profile, a leading edge and a profile chord arranged horizontally, and a leading edge protector having a front portion placed at the leading edge and a lower leg extending from the front portion and placed below the wind turbine rotor blade, wherein the front portion and the lower leg are formed as a sandwich construction having an inner top layer, an outer top layer and a core material, wherein a thickness of the core material increases from a free end of the lower leg towards the front portion in order to reduce a deformation of the wind turbine rotor blade at the leading edge.

15 Claims, 5 Drawing Sheets

SYSTEM FOR LIFTING A WIND TURBINE ROTOR BLADE

CROSS-REFERENCE TO RELATED APPLICATIONS

This application claims priority of European patent application no. 22 156 738.1, filed Feb. 15, 2022, the entire content of which is incorporated herein by reference.

TECHNICAL FIELD

The disclosure relates to a system for lifting a wind turbine rotor blade.

BACKGROUND

Wind turbine rotor blades are large, heavy and fragile parts. Handling wind turbine rotor blades at the manufacturing site, during transportation or at an erection site therefore is difficult and requires specific tools and expertise. In particular when lifting a wind turbine rotor blade to a wind turbine rotor blade hub, great care must be taken to maintain the wind turbine rotor blade in a desired position without causing damage.

So-called "blade yokes" are large frames with hydraulic pincers configured for gripping a wind turbine rotor blade at opposite sections of the pressure side and the suction side. The blade yokes are fastened to a crane hook and further include means to control an angle of the frame and a gripped wind turbine rotor blade with reference to the horizontal direction. However, these blade yokes are heavy and costly.

An alternative is provided by supporting the wind turbine rotor blade by simple slings guided around the wind turbine rotor blade's cross-section at a given distance around the blade center of gravity, usually at the root section and at a midsection. Since state-of-the-art rotor blades are transported and later installed with leading and trailing edge oriented sideways, compression will be applied on these edges during installation by the slings. However, for normal operation rotor blades are configured to withstand loads in flapwise direction, but not in edgewise direction as is the case here. Hence, the slings will most likely damage the wind turbine rotor blade in particular in the midsection where the wind turbine rotor blade has an aerodynamic profile. It is therefore known to place specific protectors at the leading edge and/or at the trailing edge of the wind turbine rotor blade.

The document DE 10 2011 113 482 B4 discloses a system for transporting a wind turbine rotor blade with a protector including a trailing edge protector and a leading edge protector fastened to a wind turbine rotor blade via two belts connecting both protectors on a pressure side and on a suction side of the blade. The leading edge protector includes a series of longitudinal contact elements arranged parallel to each other on a tensioning rope and abutting the leading edge.

The document U.S. Pat. No. 9,016,989 B2 discloses a transportation assembly for a wind turbine rotor blade configured to transport the wind turbine rotor blade with its leading edge pointing downwards. The transportation assembly includes a leading edge protector placed between a sling supporting the wind turbine rotor blade and the wind turbine rotor blade's leading edge. The leading edge protector is formed from a fiberglass laminate.

SUMMARY

It is an object of the disclosure to provide a system for lifting a wind turbine rotor blade that is easy to use when lifting the wind turbine rotor blade with its chord arranged horizontally and that provides sufficient protection.

This object is, for example, achieved by various systems for lifting a wind turbine rotor blade according to the disclosure.

According to an embodiment, a system for lifting a wind turbine rotor blade includes:
  a wind turbine rotor blade,
  a lifting device having a sling,
  the sling supporting the wind turbine rotor blade at a longitudinal position where the wind turbine rotor blade has an aerodynamic profile, a leading edge, a trailing edge, and a profile chord connecting the leading edge and the trailing edge, wherein the profile chord is arranged horizontally, and
  a leading edge protector arranged between the wind turbine rotor blade and the sling, the leading edge protector having a front portion placed at the leading edge and a lower leg extending from the front portion and placed below the wind turbine rotor blade, wherein
  the front portion and the lower leg are formed as a sandwich construction having an inner top layer, an outer top layer and a core material placed between the inner top layer and the outer top layer, wherein a thickness of the core material, measured between the inner top layer and the outer top layer, increases from a free end of the lower leg towards the front portion in order to reduce a deformation of the wind turbine rotor blade at the leading edge.

The leading edge protector is configured to protect the leading edge of a wind turbine rotor blade when lifting the same, in particular to the hub of a rotor with horizontal axis mounted at a nacelle arranged at the top of a wind turbine tower. The wind turbine rotor blade may have a blade root which may have a circular cross-section, a blade tip, a longitudinal axis, a suction side surface and a pressure side surface. In operation, the air flows past the wind turbine rotor blade in a direction generally from the leading edge towards the trailing edge. The trailing edge is defined as a line connecting the rearmost points of the aerodynamic profiles, and the leading edge is defined as a line connecting those points of the aerodynamic profiles being farthest away from the rearmost points. A straight line connecting the leading edge and the trailing edge in an aerodynamic profile is the chord of the aerodynamic profile. The pressure side surface and the suction side surface each extend along the wind turbine rotor blade's outer surface from the leading edge to the trailing edge.

The wind turbine rotor blade may include a load carrying structure, such as a spar, for example including two spar caps and one or more shear webs placed there between, and aerodynamic outer surfaces formed by skin or shell portions supported by the load carrying structure. The load carrying structure or parts thereof may also be formed integral with the shells. The wind turbine rotor blade may include a suction side half shell and a pressure side half shell adhered to each other along the leading edge and along the trailing edge. These half shells may each include at least one spar cap, and one or more shear webs may be placed between the half shells and adhered thereto.

When lifting the wind turbine rotor blade, it is preferred to arrange the chord more or less horizontally in order to keep wind forces low, in contrast to a vertical alignment of the chord that would cause much stronger wind forces. Thus, either the suction side surface or the pressure side surface of the wind turbine rotor blade points roughly downwards. The feature that the chord is arranged horizontally means that the chord is aligned substantially horizontally. It does not mean the chord is aligned perfectly horizontally, but may include substantial deviations, such as for example up to +/−30°.

The leading edge protector has a front portion which is placed at the leading edge, and a lower leg which is placed below the wind turbine rotor blade, in particular at an outer surface of the wind turbine rotor blade pointing downwards, either the suction side surface or the pressure side surface. The leading edge protector therefore covers the outer surface of the wind turbine rotor blade in a region around the leading edge. This region in a direction towards the trailing edge extends partly over the suction side surface and/or partly over the pressure side surface, in particular via the lower leg arranged below the wind turbine rotor blade.

The inventors noticed that when lifting a wind turbine rotor blade via a sling, large forces are exerted in substantially horizontal direction at the trailing edge and at the leading edge. Their calculations showed that these forces, however, when analyzed on a "per surface unit basis", did in most cases not exceed generally accepted limits. Further investigations revealed that the forces exerted by the sling in combination with longitudinal bending of the wind turbine rotor blade, when supported by the sling at a typical longitudinal position, lead to a significant deformation of the wind turbine rotor blade's cross section. It was found that this deformation may lead to failure of the wind turbine rotor blade structure, in particular at the leading edge where an adhesive bond between different structural elements of the wind turbine rotor blade (such as between two half-shells) may be formed.

In order to reduce the deformation of the wind turbine rotor blade at the leading edge, the leading edge protector is placed between the sling and the wind turbine rotor blade. The leading edge protector, due to the specific sandwich construction of the front portion and the lower leg, forms a unitary, stiff body. To this end, the leading edge protector is provided with a core material having a varying thickness. It is the thickness of the core material that imparts stiffness to the sandwich construction, and by making the core material particularly thick at the front portion and decreasing the thickness towards a free end of the lower leg, an efficient and optimal load distribution is obtained.

The core material thickness may be selected such that it approximately levels a core material thickness within the rotor blade in a region between the leading edge and a maximum thickness chord position and, thus efficiently distributes the forces exerted by the sling over the complete length of the protector and in such a way over a larger surface area of the wind turbine rotor blade covered by the leading edge protector. Since the rotor blade is configured to withstand large bending moments in flap wise direction and lower bending moments in edgewise direction, maximum core material thickness within a profile is usually located at the maximum thickness chord position and lowest to non-existent at the leading edge. Inverting this configuration rule for the leading edge protector helps to avoid excessive loads on the wind turbine rotor blade's outer surface, in particular at or close to the leading edge, where the wind turbine rotor blade is particularly prone to failure.

The sandwich construction is particularly lightweight, so that the leading edge protector is easy to handle and transport. This also contributes to a safe lifting process of the wind turbine rotor blade.

In an aspect, the leading edge protector is shaped such that the inner top layer extends over a defined area of an outer surface of the wind turbine rotor blade and is in contact with the entire defined area. In other words, the leading edge protector is provided with a complimentary shape such that it provides optimal support for the wind turbine rotor blade over the entire area covered by the leading edge protector. This contributes to the desired reduction of any deformation of the wind turbine's cross section. The complementary shape of the inner top layer means the leading edge protector provides optimum protection and support for the wind turbine rotor blade, wherein no gap or almost no gap is present between the inner surface of the inner top layer and the suction side surface and the pressure side surface of the rotor blade.

In an aspect, the leading edge protector includes an upper leg which extends from the front portion as an integral part of the sandwich construction and is placed above the wind turbine rotor blade. This means the leading edge protector can be used to protect a wind turbine rotor blade's leading edge, no matter whether it is supported by the sling with its pressure side or its suction side pointing downwards. The upper leg is placed at the wind turbine rotor blade's outer surface which is pointing upwards. The inner top layer and the outer top layer may extend without interruption over both legs and the front portion. The core material may be provided as a continuous layer also extending over both legs and the front portion. In this aspect, the leading edge protector encompasses a larger region of the wind turbine rotor blade's outer surface, including a section of the suction side and a section of the pressure side. This also helps reducing deformation of the wind turbine rotor blade's cross section.

In an aspect, the thickness of the core material increases from a free end of the upper leg towards the front portion. In other words, the core material thickness will have a maximum value at the front portion and will decrease towards the free ends of both legs. This gives the leading edge protector the necessary shape and strength in the front portion and helps to save weight and material in both leg portions. It also helps to obtain a smooth load distribution at the free end of the upper leg.

In an aspect, the wind turbine rotor blade at the longitudinal position has a shell structure with a shell thickness, wherein the thickness of the core material of the leading edge protector is selected such that the thickness of the core material at the front portion in combination with the adjacent shell thickness is not less than a maximum thickness of the shell structure in a region covered by the leading edge protector. The shell structure may have a sandwich construction as well and may include inner and outer layers of a fiber reinforced composite material and a core material placed therebetween. A main laminate or another comparable reinforcing structure may form an integral part of the shell structure as well. All elements of the shell structure together form the shell thickness, which may vary at the longitudinal position between the leading edge and the trailing edge. Typically, the shell thickness will have a maximum value at or close to the chord position where the aerodynamic profile has a maximum thickness. From there towards the leading edge, the shell thickness typically decreases and reaches a minimum value at or close to the leading edge. The selection of the core material thickness defined in this aspect ensures that the shell structure in combination with the leading edge protector provides sufficient stiffness at the leading edge to avoid or reduce a deformation of the wind turbine rotor blade's cross section. In particular, the change in thickness of the core material from the front portion towards the free end of the lower leg and/or towards the free end of the upper leg may invert a shell thickness distribution of the shell structure in a section covered by the leading edge protector.

Such a complimentary increase in core material thickness of the leading edge protector is leading to a nearly levelled combined core material thickness in a combined cross section of the rotor blade shell and the leading edge protector. The stiffening effect then is achieved by the nearly constant thickness of both core materials along the leading edge protector. Ribs or similar stiffening elements are not necessary. At the free end of the upper leg and/or at the free end of the lower leg, the core material may have a minimum thickness which may be for example half of its thickness at the front portion. Preferably, the core material thickness at the free ends is reduced to zero or to almost zero, so that a smooth transition in stiffness towards both free ends is obtained.

In an aspect, the lower leg is at least twice as long as the upper leg. The length of the upper leg may also be even shorter, so that it covers just a small area of the wind turbine rotor blade's upper surface near the leading edge. It was found that a short upper leg does not only save weight and material, but also supports the positioning of the leading edge protector at the wind turbine rotor blade surface.

In an aspect, the lower leg and the upper leg have approximately the same length. In general, both the lower leg and the upper leg may have inner surfaces shaped to correspond to the respective outer surfaces of the wind turbine rotor blade. When both legs have approximately the same length, it is possible to use the leading edge protector in both orientations, with either the lower leg or the upper leg placed below the wind turbine rotor blade. Therefore, the wind turbine rotor blade can be supported by the leading edge protector no matter if the pressure side or the suction side points downwards.

In an aspect, the leading edge protector includes two parallel lateral boundaries formed on the outer top layer along the lower leg, and the sling is arranged between the lateral boundaries. The boundaries may be formed along lateral sides of the lower leg, for example by laminating one or more additional layers of a fiber material onto the outer top layer, or by attaching boundaries of any other material, such as metal or wood, to the outer top layer. The lateral boundaries run in parallel and have a distance to each other which is sufficiently wide for placing the sling therein between. The lateral boundaries help to prevent the sling from slipping off from the leading edge protector.

In an aspect, the leading edge protector includes a plurality of lugs extending from lateral sides of the leading edge protector. The lugs may for example be formed by the inner top layer and/or by the outer top layer, or by additional members attached thereto. When the leading edge protector is placed at the wind turbine rotor blade, the lugs are accessible for fastening a belt or rope thereto, wherein the belt or rope may be used in particular to fasten the leading edge protector to the sling. This is a simple and efficient means to prevent the leading edge protector from falling down when the sling is removed from a wind turbine rotor blade.

In an aspect, the inner top layer includes a cover layer of a soft, elastic material. In particular, a layer of rubber may be used. The softness and elasticity of the material helps to protect the wind turbine rotor blades' outer surface, in particular in view of manufacturing tolerances and variations of the actual position where the leading edge protector is applied to a given wind turbine rotor blade geometry. A rubber layer helps to level blade surface tolerances and also provides friction.

In an aspect, the inner top layer and/or the outer top layer includes a fiber reinforced composite material. In general, the top layers can also be formed by other materials providing sufficient stability, such as sheet metal. However, a fiber reinforced composite material provides excellent stiffness at reduced weight and also provides a surface compatible with the surface of a wind turbine rotor blade. Therefore, a lightweight, strong and durable construction is obtained.

In an aspect, the fiber reinforced composite material includes reinforcing fibers arranged at angles of 0°, 90°, +45° and −45° with reference to a longitudinal direction of the lower leg. This helps to obtain a particularly stiff structure with high torsional stability.

In an aspect, the core material includes balsa wood. In general, any suitable core material may be used, for example a foamed plastics material such as polyethylene. Balsa wood is a lightweight material with excellent stiffness properties resulting in a robust and stiff configuration.

In an aspect, the lower leg extends up to a chord position of the wind turbine rotor blade where the aerodynamic profile has a maximum thickness. At this chord position, the wind turbine rotor blade exhibits a particularly stiff structure, such as a main laminate of a half shell and/or a main spar cap. Extending the lower leg up to this chord position therefore helps to transfer loads into the load carrying structure of the wind turbine rotor blade and thus to avoid excessive forces and/or deformation at the leading edge.

In an aspect, the lifting device includes a longitudinal beam, at least one cross-beam attached to the longitudinal beam and a release mechanism, wherein the sling is connected to the cross-beam and the release mechanism is adapted to open the sling and/or to disconnect one end of the sling from the cross-beam. The release mechanism makes it easy to release a wind turbine rotor blade supported by the lifting device. In particular, this can be performed easily via the release mechanism once the wind turbine rotor blade has been attached to a hub. In particular, the leading edge protector may be fastened to the sling and/or to the cross-beam or any other member of the lifting device to prevent the leading edge protector from falling down.

BRIEF DESCRIPTION OF DRAWINGS

The invention will now be described with reference to the drawings wherein.

DETAILING DESCRIPTION

Figure 1:
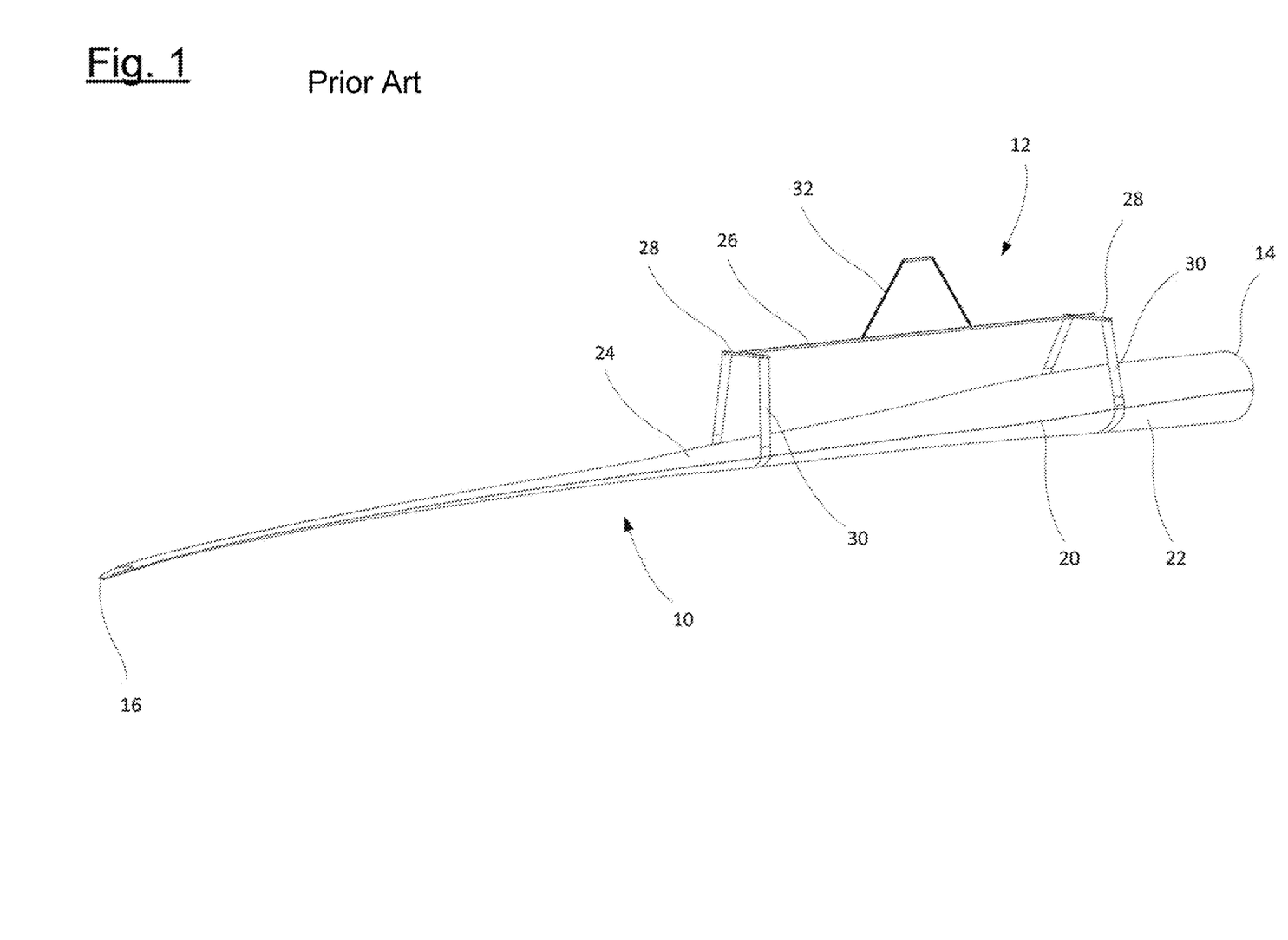
FIG. 1 shows a wind turbine rotor blade supported by a lifting device shown in a perspective view.

FIG. 1 shows a wind turbine rotor blade 10 fastened to a lifting device 12. The wind turbine rotor blade 10 has a circular blade root 14, a blade tip 16, a leading edge 18 (not visible in FIG. 1), a trailing edge 20, a suction side 22 pointing downwards and a pressure side 24 pointing upwards. The wind turbine rotor blade 10 has a length of about 80 m or more. Its longitudinal axis and a profile chord 64 (see FIGS. 3A to 3C) are arranged horizontally.

The lifting device 12 includes a longitudinal beam 26 arranged parallel to the longitudinal axis of the wind turbine rotor blade 10 and extending over about one quarter of the wind turbine rotor blades' length. At each of the two ends of the longitudinal beam 26, the lifting device includes a shorter cross-beam 28. The lifting device 12 further includes two slings 30. Each sling 30 is guided around the wind turbine rotor blades' cross-section so that a central section of each sling 30 is placed below the wind turbine rotor blade 10, at the suction side 22 thereof. Further, each sling 30 has two free ends attached to one end of the corresponding cross-beam 28. A midsection of the longitudinal beam 26 is provided with a chain 32 or comparable attachment means for connecting to a hook of a crane.

The wind turbine rotor blade 10 is positioned in the lifting device 12 such that the wind turbine rotor blades' center of gravity lies below a midpoint of the longitudinal beam 26. This means that one of the slings 30 is positioned relatively close to the blade root 14 and the other one of the slings 30 is arranged at a longitudinal position approximately at a midsection of the wind turbine rotor blade 10. The sling 30 closer to the blade root 14 supports a cross-section already having an aerodynamic profile but with a large relative thickness.

Figure 2A:
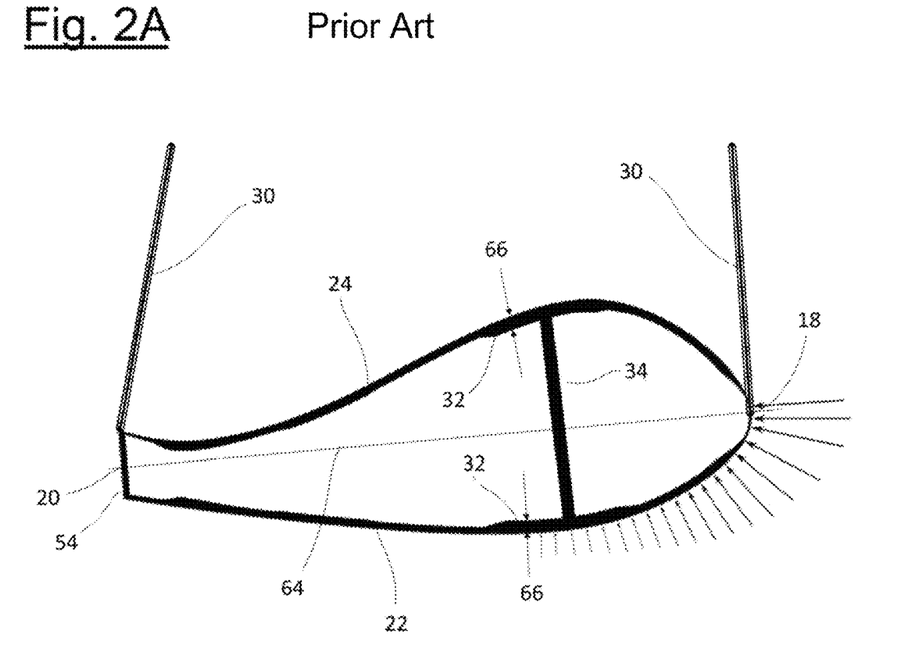
FIGS. 2A and 2B show a wind turbine rotor blade supported by a sling without a leading edge protector (FIG. 2A) and with a leading edge protector (FIG. 2B) shown in cross-section.
Figure 2B:
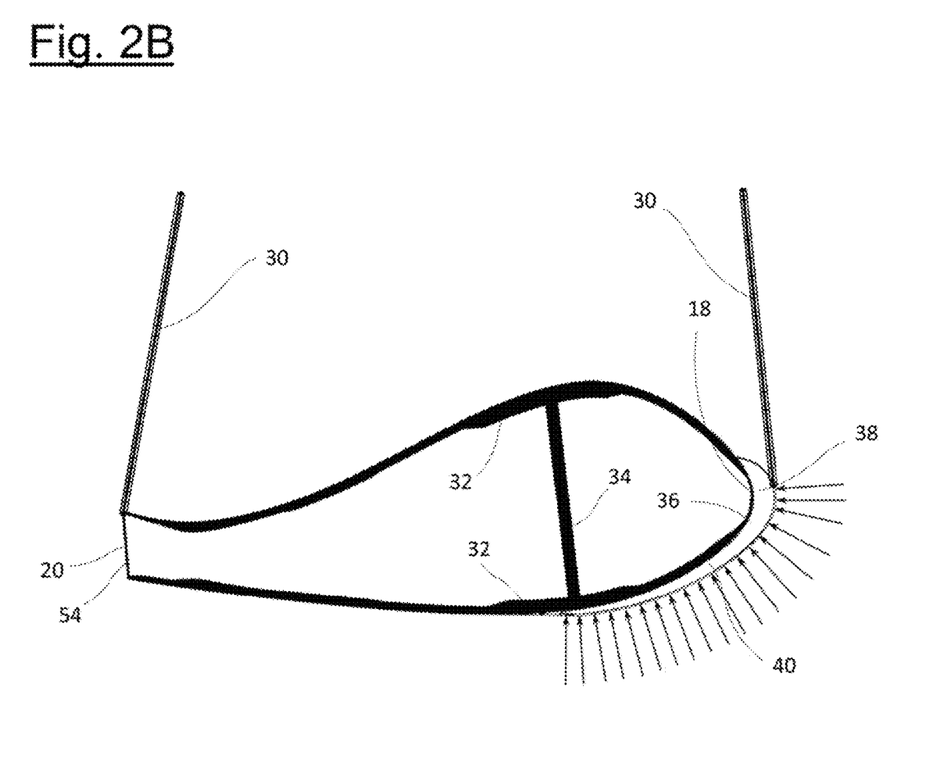

At the longitudinal position supported by the other one of the slings 30, the wind turbine rotor blade 10 has an aerodynamic profile shown in cross-section in FIGS. 2A and 2B. In FIG. 2A, the wind turbine rotor blade 10 is shown supported by a sling 30 without a leading edge protector. The wind turbine rotor blade's cross-section is formed by two half shells adhered to each other at the leading edge 18 and at the trailing edge 20. The profile chord 64 is a straight line connecting the leading edge 18 and the trailing edge 20. At the trailing edge 20, the cross-section includes a flat element 54 forming a so-called flatback profile. The varying thickness of the half shells shows that the half shells are formed as sandwich constructions themselves, including a core material extending over a majority of the half shells' widths. Only at the leading edge 18 and close to the trailing edge 20, the half shells consist of a solid, relatively thin laminate of a fiber reinforced plastics material. A shell thickness 66 is indicated for both half shells at a chord position where the shell thickness 66 has a maximum value.

At a chord position where the aerodynamic profile has its maximum thickness, both half shells are supported by a spar cap 32 formed integral with the respective half shell. Between these spar caps 32, a shear web 34 is placed and adhered to both spar caps 32, thereby forming a central load carrying structure.

The arrows shown at the leading edge 18 and below a front portion of the suction side 22 illustrate the forces exerted by the sling 30 onto the wind turbine rotor blade's outer surface. One can see that excessive loads are applied to the leading edge 18 which is a particularly fragile portion of the wind turbine rotor blade's cross-section, where the relatively thin-walled half shells are adhered together. At the chord's central portion, below the spar cap 32 of the suction side half shell, where the wind turbine rotor blades' outer surface is most stiff, only much lower forces are applied.

In FIG. 2B, the same wind turbine rotor blade 10 is shown supported by sling 30 but with a leading edge protector 36 placed between the wind turbine rotor blade 10 and the sling 30. The leading edge protector 36 has a front portion 38 and a lower leg 40. One can see in the cross-section shown that a thickness of the leading edge protector 36 is largest at the front portion 38 placed at the leading edge 18, and decreases from there continuously along the lower leg 40, towards the leading edge protector's lowermost and leftmost end which is positioned right below the spar cap 32 of the suction side 22. The arrows again illustrate the forces exerted onto the wind turbine rotor blades' outer surface (although for illustrative purposes, the arrow's tips end at the sling 30, not on the wind turbine rotor blades' outer surface). The forces are distributed in a much more even manner via the leading edge protector 36.

Figure 3A:
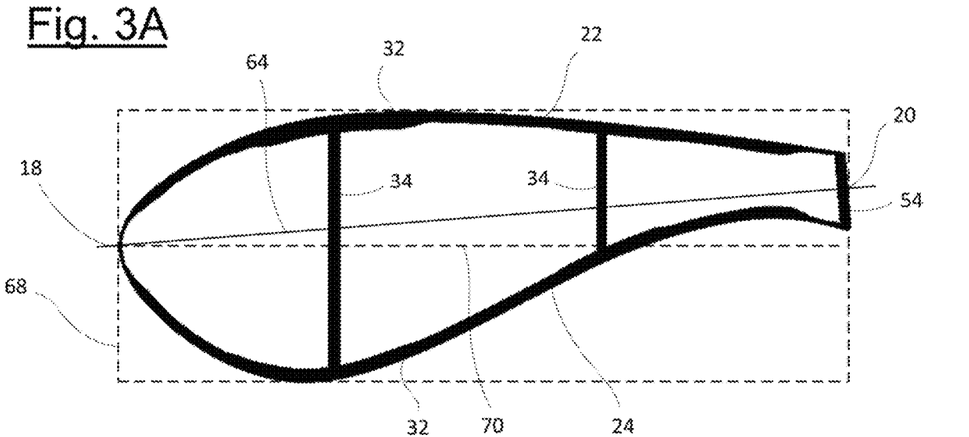
FIGS. 3A to 3C show a wind turbine rotor blade in a neutral state (FIG. 3A) and when supported by a sling without a leading edge protector (FIG. 3B) and with a leading edge protector (FIG. 3C) shown in cross-section.
Figure 3B:
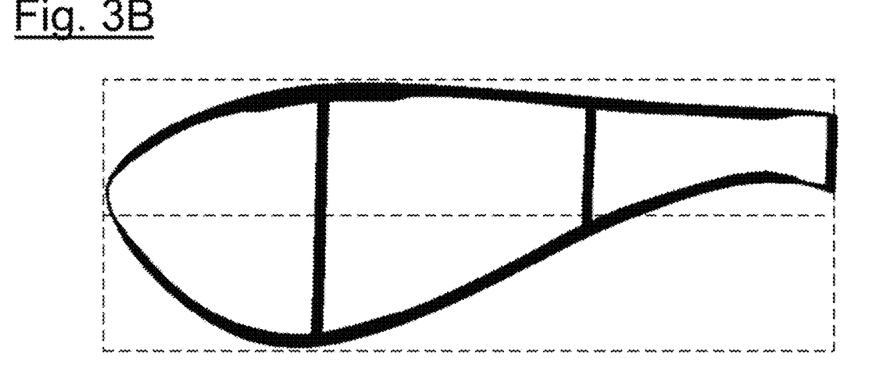
Figure 3C:
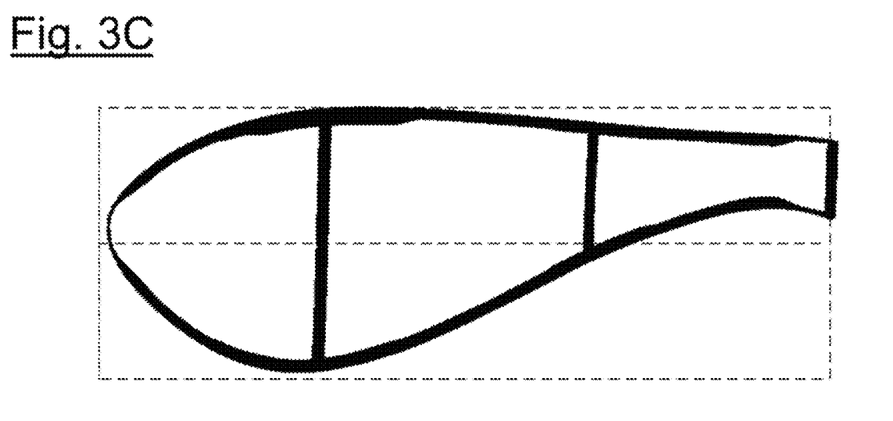

FIGS. 3A, 3B and 3C each show a cross section of the wind turbine rotor blade 10, drawn at the same longitudinal position in different load scenarios. The elements of the wind turbine rotor blade 10 are depicted with the same reference numerals as in FIGS. 2A and 2B. In contrast to FIGS. 2A and 2B, the wind turbine rotor blade 10 has two shear webs 34 and is positioned with the suction side 22 pointing upwards. The profile chord 64 is arranged horizontally. To better illustrate the deformation of the wind turbine rotor blade 10 in different load scenarios, the cross section is drawn in a rectangular box 68 having the same size in each of the FIGS. 3A, 3B and 3C and deformations are exaggerated.

FIG. 3A shows the wind turbine rotor blade 10 in a neutral state without any loads. The aerodynamic profile is not deformed and has its regular shape. The shear webs 34 are arranged exactly vertically, the suction side 22 has a smooth, convex curvature. The leading edge 18 is positioned at a midline 70 of the rectangular box 68.

FIG. 3B shows the wind turbine rotor blade 10 when supported by a sling 30 (not shown) applied directly below the wind turbine rotor blade 10, without a leading edge protector 36. The cross section is deformed significantly. The smooth convex curvature of the suction side 22 is no longer there in particular in a rear part close to the shear web 34 arranged near the trailing edge 20, where the suction side 22 even has a concave curvature. Both shear webs 34 are inclined with reference to the vertical direction. The inclination of the flat element 54 formed at the trailing edge 20 has changed its direction as compared to FIG. 3A. Most importantly, the leading edge 18 was pressed upward- and inwardly, so that it is no longer at the height of the midline 70, but significantly above. In this context, a radius of curvature of the aerodynamic profile at the leading edge 18 is much smaller in FIG. 3B than in FIG. 3A. This deformation at the leading edge 18 is likely to damage the wind turbine rotor blade 10.

In FIG. 3C, the wind turbine rotor blade 10 is supported by a sling 30 with a leading edge protector 36 placed between the wind turbine rotor blade 10 and the sling 30. The leading edge protector 36 and the sling 30 are not shown in FIG. 3C, but are placed as is illustrated in FIG. 2B. One can see there still is some deformation, both shear webs 34 and the flat element 54 are still inclined as compared to FIG. 3A. However, the deformation at the leading edge 18 is much less than in FIG. 3B. In particular, the radius of curvature of the aerodynamic profile at the leading edge 18 is similar to the neutral state shown in FIG. 3C, so that the wind turbine rotor blade 10 will not be damaged.

Figure 4:
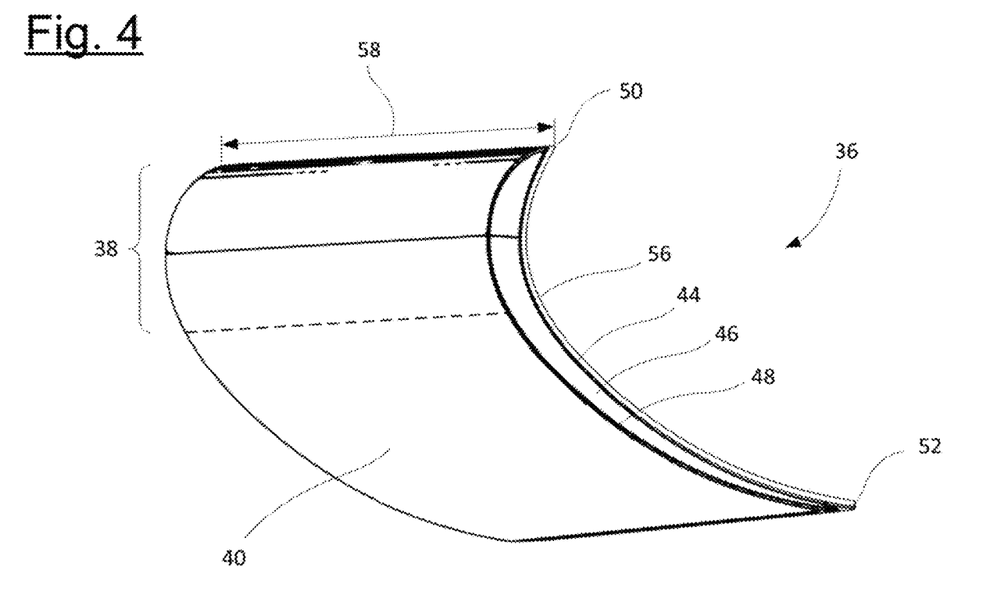
FIG. 4 is a leading edge protector shown in a perspective view.

FIG. 4 shows the leading edge protector 36 of FIG. 2B in isolation. It has a front portion 38 and a lower leg 40. These elements are formed as a sandwich construction including an inner top layer 44, a core material 46 and an outer top layer 48. The core material 46 has a thickness measured between the inner top layer 44 and the outer top layer 48, the thickness having a maximum value at the front portion 38 and decreasing continuously from there to zero at a free end 50 of the upper leg 42 and at a free end 52 of the lower leg 40.

The inner top layer 44, the outer top layer 48 and the core material 46 each extend over the entire way from the free end 50, along the upper leg 42, over the front portion 38 and along the lower leg 40 towards the free end 52. At the outer side of the inner top layer 44, a soft, elastic rubber layer 56 is provided. It covers the entire surface of the inner top layer 44. A width 58 of the leading edge protector 36 is measured along the direction of the leading edge 18 and is approximately constant over the entire leading edge protector 36.

Figure 5:
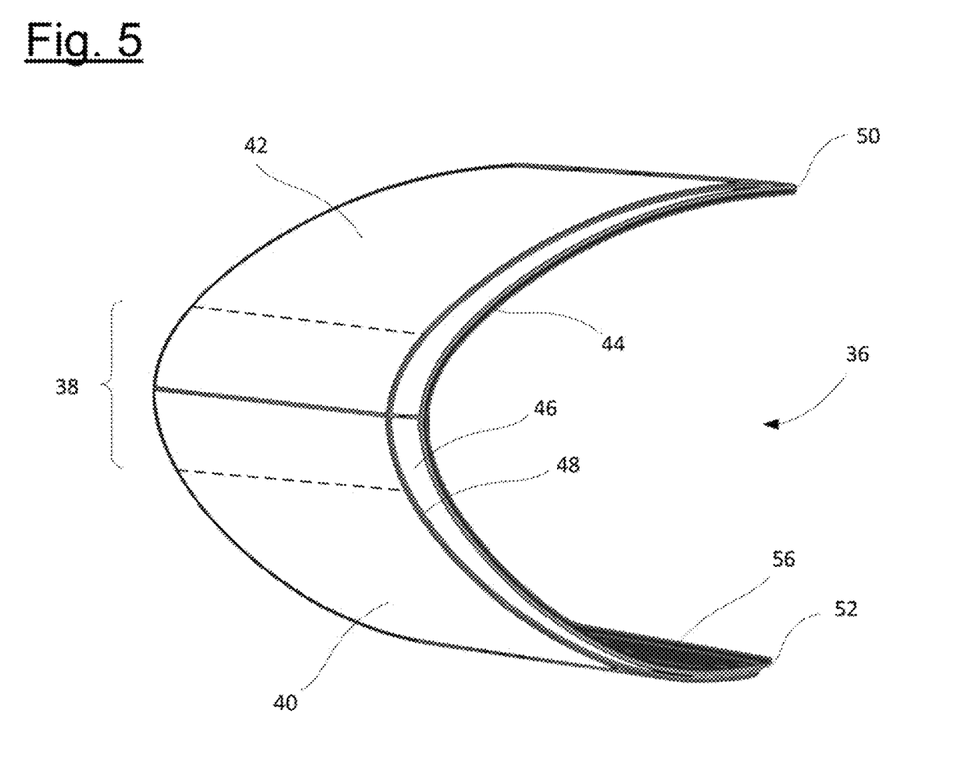
FIG. 5 is another leading edge protector shown in a perspective view.

FIG. 5 shows another leading edge protector 36 of similar construction as the leading edge protector 36 of FIG. 4, but with a lower leg 40 and an upper leg 42 having approximately the same length. In particular, both legs 40, 42 extend up to a chord position where the wind turbine rotor blade 10 has a maximum thickness. This means the leading edge protector 36 of FIG. 5 can be used to protect a wind turbine rotor blade's leading edge 18, no matter whether it is supported by the slings 30 with its pressure side 24 or its suction side 22 pointing downwards.

Figure 6:
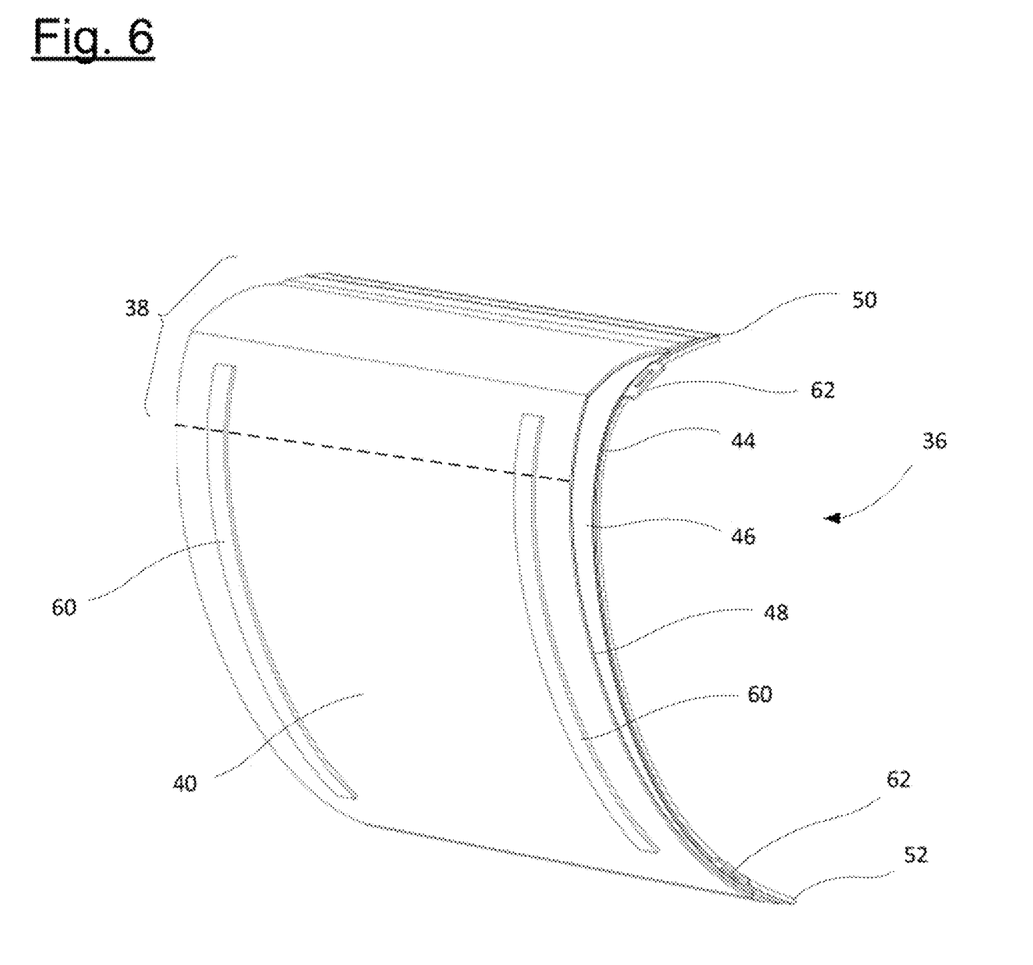
FIG. 6 is still another leading edge protector shown in a perspective view.

FIG. 6 shows still another leading edge protector 36 having an overall shape similar to the one shown in FIG. 4, with a lower leg 40. The leading edge protector 36 of FIG. 6 is equipped with two lateral boundaries 60 arranged in parallel on the outer surface of the outer top layer 48. They are positioned such that the sling 30 can easily be placed between them. Further, the leading edge protector 36 of FIG. 6 includes two lugs 62 arranged at each lateral side of the leading edge protector 36. These lugs 62 can be used to fasten the leading edge protector 36 to the sling 30.

It is understood that the foregoing description is that of the preferred embodiments of the invention and that various changes and modifications may be made thereto without departing from the spirit and scope of the invention as defined in the appended claims.

LIST OF REFERENCE NUMERALS (PART OF THE DESCRIPTION)

10 wind turbine rotor blade
12 lifting device
14 blade root
16 blade tip
18 leading edge
20 trailing edge
22 suction side
24 pressure side
26 longitudinal beam
28 cross-beam
30 sling
32 spar cap
34 web
36 leading edge protector
38 front portion
40 lower leg
42 upper leg
44 inner top layer
46 core material
48 outer top layer
50 free end of upper leg
52 free end of lower leg
54 flat element
56 rubber layer
58 width
60 lateral boundary
62 lug
64 chord
66 shell thickness
68 box
70 midline

The invention claimed is:

1. A system for lifting a wind turbine rotor blade, the system comprising:
a wind turbine rotor blade;
a lifting device having a sling;
said sling being configured to support said wind turbine rotor blade at a longitudinal position where said wind turbine rotor blade has an aerodynamic profile, a leading edge, a trailing edge, and a profile chord connecting said leading edge and said trailing edge, wherein said profile chord is arranged horizontally;
a leading edge protector configured to be arranged between said wind turbine rotor blade and said sling, said leading edge protector having a front portion configured to be placed at said leading edge and a lower leg extending from said front portion and configured to be placed below said wind turbine rotor blade;
said front portion and said lower leg being formed as a sandwich construction having an inner top layer, an outer top layer, and a core material disposed between said inner top layer and said outer top layer;
said core material having a thickness measured between said inner top layer and said outer top layer;
said lower leg having a free end; and,
said thickness increasing continuously from said free end of said lower leg toward said front portion to reduce a deformation of said wind turbine rotor blade at said leading edge.

2. The system of claim 1, wherein said leading edge protector is shaped such that said inner top layer extends over a defined area of an outer surface of said wind turbine rotor blade and is in contact with all of said defined area.

3. The system of claim 1, wherein said leading edge protector has an upper leg extending from said front portion as an integral part of said sandwich construction and said leading edge protector is configured to be placed above said wind turbine rotor blade.

4. The system of claim 3, wherein said upper leg has an upper leg free end; and, said thickness of said core material increases from said upper leg free end towards said front portion.

5. The system of claim 3, wherein said lower leg is at least twice as long as said upper leg.

6. The system of claim 3, wherein said lower leg and said upper leg have a same length.

7. The system of claim 1, wherein said leading edge protector includes two parallel lateral boundaries formed on said outer top layer along said lower leg; and, said sling is arranged between said two lateral boundaries.

8. The system of claim 1, wherein said leading edge protector includes a plurality of lugs extending from lateral sides of said leading edge protector.

9. The system of claim 1, wherein said inner top layer includes a cover layer of an elastic material.

10. The system of claim 1, wherein at least one of said inner top layer and said outer top layer includes a fiber reinforced composite material.

11. The system of claim 10, wherein said fiber reinforced composite material includes reinforcing fibers arranged at angles of 0°, 90°, +45° and −45° with reference to a longitudinal direction of said lower leg.

12. The system of claim 1, wherein said core material includes balsa wood.

13. The system of claim 1, wherein said lifting device includes a longitudinal beam, at least one cross-beam attached to said longitudinal beam, and a release mechanism; said sling is connected to said cross-beam; and, said release mechanism is configured to at least one of open said sling and disconnect an end of said sling from said cross-beam.

14. A system for lifting a wind turbine rotor blade, the system comprising:
a wind turbine rotor blade;
a lifting device having a sling;
said sling being configured to support said wind turbine rotor blade at a longitudinal position where said wind turbine rotor blade has an aerodynamic profile, a leading edge, a trailing edge, and a profile chord connecting said leading edge and said trailing edge, wherein said profile chord is arranged horizontally;
a leading edge protector configured to be arranged between said wind turbine rotor blade and said sling, said leading edge protector having a front portion configured to be placed at said leading edge and a lower leg extending from said front portion and configured to be placed below said wind turbine rotor blade;
said front portion and said lower leg being formed as a sandwich construction having an inner top layer, an outer top layer, and a core material disposed between said inner top layer and said outer top layer;
said core material having a thickness measured between said inner top layer and said outer top layer;
said lower leg having a free end;
said thickness increasing from said free end of said lower leg toward said front portion to reduce a deformation of said wind turbine rotor blade at said leading edge;
wherein said wind turbine rotor blade, at the longitudinal position, has a shell structure with a shell thickness; and,
said thickness of said core material of said leading edge protector is selected such that said thickness of said core material at said front portion in combination with said shell thickness adjacent to said thickness of said core material is not less than a maximum thickness of said shell structure in a region covered by said leading edge protector.

15. A system for lifting a wind turbine rotor blade, the system comprising:
a wind turbine rotor blade;
a lifting device having a sling;
said sling being configured to support said wind turbine rotor blade at a longitudinal position where said wind turbine rotor blade has an aerodynamic profile, a leading edge, a trailing edge, and a profile chord connecting said leading edge and said trailing edge, wherein said profile chord is arranged horizontally;
a leading edge protector configured to be arranged between said wind turbine rotor blade and said sling, said leading edge protector having a front portion configured to be placed at said leading edge and a lower leg extending from said front portion and configured to be placed below said wind turbine rotor blade;
said front portion and said lower leg being formed as a sandwich construction having an inner top layer, an outer top layer, and a core material disposed between said inner top layer and said outer top layer;
said core material having a thickness measured between said inner top layer and said outer top layer;
said lower leg having a free end;
said thickness increasing from said free end of said lower leg toward said front portion to reduce a deformation of said wind turbine rotor blade at said leading edge; and,
wherein said lower leg extends up to a chord position of said wind turbine rotor blade where said aerodynamic profile has a maximum thickness.

* * * * *